United States Patent
Rawat

(10) Patent No.: US 11,946,256 B1
(45) Date of Patent: Apr. 2, 2024

(54) GUTTER CLEANING TOOL

(71) Applicant: Rhea Rawat, Edison, NJ (US)

(72) Inventor: Rhea Rawat, Edison, NJ (US)

( * ) Notice: Subject to any disclaimer, the term of this patent is extended or adjusted under 35 U.S.C. 154(b) by 0 days.

(21) Appl. No.: 18/317,084

(22) Filed: May 14, 2023

(51) Int. Cl.
*E04D 13/076* (2006.01)
*B25J 1/04* (2006.01)

(52) U.S. Cl.
CPC ............ *E04D 13/0765* (2013.01); *B25J 1/04* (2013.01)

(58) Field of Classification Search
CPC ............................... E04D 13/0765; B25J 1/04
USPC ................. 294/209, 210; 15/236.04
See application file for complete search history.

(56) References Cited

U.S. PATENT DOCUMENTS

| | | | |
|---|---|---|---|
| 2,720,409 A | 10/1955 | Griffith | |
| 3,601,835 A | 8/1971 | Morgan | |
| 3,972,552 A | 8/1976 | Earp, Jr. | |
| 5,692,417 A * | 12/1997 | Irpino | B25B 13/48 81/53.12 |
| 6,471,271 B1 * | 10/2002 | Segal | E04D 13/0765 294/111 |
| 7,802,338 B1 * | 9/2010 | Hall | B08B 5/04 15/348 |
| 7,926,141 B2 * | 4/2011 | Dayton | E04D 13/0765 15/88.4 |
| 9,347,223 B1 * | 5/2016 | Ashton-Miller | B08B 5/02 |
| 9,679,760 B2 * | 6/2017 | Johnson | F21V 21/36 |
| 10,567,709 B1 * | 2/2020 | Motill | H04N 23/57 |
| 2015/0158183 A1 * | 6/2015 | Mcnay | B25J 1/04 74/491 |

FOREIGN PATENT DOCUMENTS

| | | | | |
|---|---|---|---|---|
| DE | 102004049169 A1 * | 4/2006 | ......... | E04D 13/0765 |
| GB | 2603875 A * | 8/2022 | ............... | B08B 3/02 |

* cited by examiner

*Primary Examiner* — Dean J Kramer

(57) ABSTRACT

A cleaning tool particularly adapted to cleaning gutters from a position below the gutter, such as on the ground. The invention removes most of the manual work associated with operating the device and integrates with a motor providing an adjustable motor driver switch to control the tension of the rope to close the far end gripper, pick debris and release the debris using the motor control buttons. The far end of the pole has a video capturing device paired with a video display device near the near end.

1 Claim, 2 Drawing Sheets

GUTTER CLEANING TOOL

CROSS-REFERENCE TO RELATED APPLICATIONS

U.S. Patent Documents

U.S. Pat. No. 2,720,409 A 10/1955 Griffith . . . 294/19.1
U.S. Pat. No. 2,817,867 A 12/1957 Bugbird . . . 294/19.1
U.S. Pat. No. 2,896,239 A 7/1959 Bugbird . . . 294/19.1
U.S. Pat. No. 3,023,971 A 03/1962 Milhous . . . 401/137
U.S. Pat. No. 3,601,835 A 8/1971 Morgan . . . 15/105
U.S. Pat. No. 3,743,339 A 7/1973 Brackett . . . 294/19.1
U.S. Pat. No. 3,858,267 A 1/1975 Swannie . . . 294/19.1
U.S. Pat. No. 3,972,552 A 8/1976 Earp, Jr . . . 294/19.1
U.S. Pat. No. 4,057,276 A 11/1977 Curie . . . 294/19.1
U.S. Pat. No. 4,114,938A 9/1978 Strader . . . 294/19.1
U.S. Pat. No. 4,194,780 A 3/1980 Dilley . . . 294/19.1
U.S. Pat. No. 4,310,940A 1/1982 Moore . . . 15/105
U.S. Pat. No. 4,319,851 A 3/1982 Arthur . . . 401/137
U.S. Pat. No. 4,640,540 A 2/1987 Chisholm . . . 294/55
U.S. Pat. No. 4,750,883A 6/1988 Drake . . . 401/137
U.S. Pat. No. 4,848,818A 7/1989 Smith . . . 294/19.1
U.S. Pat. No. 4,930,824 A 6/1990 Mathews et al. . . . 294/19.1
U.S. Pat. No. 4,958,397 A 9/1990 Ryan . . . 15/93.1
U.S. Pat. No. 5,114,199 A 5/1992 Newcomer . . . 294/50.8
U.S. Pat. No. 5,727,580 A 3/1998 Patterson . . . 134/155 R
U.S. Pat. No. 5,823,590 A 10/1998 Forrest et al. . . . 294/19.1
U.S. Pat. No. 5,853,209 A 12/1998 McDermott . . . 294/19.1
U.S. Pat. No. 5,855,402 A 01/1999 Maraschiello . . . 294/19.1
U.S. Pat. No. 6,139,077 A 10/2000 Molzan . . . 294/19.1
U.S. Pat. No. 6,209,937 B1 04/2001 Keiter . . . 294/19.1
U.S. Pat. No. 6,254,153 B1 07/2001 Poppa . . . 294/19.1
US 20090315354 A1 12/2009 DaVia . . . 294/111
U.S. Pat. No. 7,740,296 B2 06/2010 DaVia . . . 294/19.1
US 20150368905 A1 12/2015 Nichols . . . E04D 13/0765
US 20180163759 A1 06/2018 Ivan . . . B25G 1/04

BACKGROUND OF THE INVENTION

The present invention relates to cleaning tool, particularly gutter cleaning devices.

Rainwater on the roof is channeled through gutters away from the roof. Overtime gutters tend to clog up with debris including falling leaves, twigs, roofing material and other things. This blocks the flow of water into the gutters leading to uncontrolled overflow damaging siding, washing away landscaping materials, destroying landscape plants, leaking into the basement and causing cracks in your home foundation. Additionally overflow from blocked gutters cause inefficiency in the rainwater harvesting systems attached to the homes for efficient use of rain water.

Overtime many gutter cleaning tools have been developed to help clean the gutters. The most basic tools require climbing on to the roof or using a ladder and using hand held tools to clean the gutters, however this is very hazardous. In order to avoid climbing on to the roof overtime tools that can be used while standing on the ground have been developed. Some tools pump water up to the gutter via a nozzle to clean it, this is a significant waste of water in a world headed towards a water crisis and it also leads to debris and water washing over the sidings and other undesirable places causing a bigger cleanup effort. Other tools attach to a vacuum blower and try to blow the debris out leading to the debris spreading all over undesirable areas as well as perpetuating the use of non-renewable energy sources. None of these gutter cleaning tools are readily adopted in the market. The key reason is that these tools are inefficient, unwieldy even for the strong and require a lot of body strength to hold the device with one hand on the ground and try to maneuver with the other. Existing devices require manual operation like pulling a rope, using a hand gripper to create tension, constantly viewing up on mounted mirrors and lack automated operation with camera feeds. In colonial style architectures existing tools are almost impossible to use often leading to outsourcing gutter cleaning every once in a while, and letting gutters overflow till there is budget to spend money getting them cleaned. Additionally, there is no tool in the market today that can be used easily and quickly by teenagers including but not limited to girls.

SUMMARY OF THE INVENTION

The primary objective of the present invention is to overcome many of the deficiencies highlighted above, particularly it is very lightweight, can be operated from the ground at a distance, provides full view of the debris to be removed without looking up and is operated automatically by a push of a button. The present invention, while primarily being used for cleaning gutters is not limited to this single use and can be used for any type of work that requires reaching inaccessible areas using a long pole and a tool attached to the pole that can grip the said object. In such an embodiment, the present invention comprises of a telescopic pole with a near end and a far end. The pole is extensible in nature and very lightweight made of aluminum, light weight carbon fiber or any other light material available. The far end of the pole has a mounted gripper tong adapted to fit inside the gutter channel. The invention comprises of using multitude of gripper tongs of varying shape and sizes depending on the debris being removed. A mechanism is provided which is operable to move the gripper tong relative to a press member.

A line such as a rope, cable, cord or the like extends along the pole, outside the pole from the gripper mount at the far end to the near end of the pole. At the near end of the pole is a self-locking motor with a speed controller and an directional adjustable motor driver switch. The D Shaft of the motor is attached via a mounting hub to a wheel over which the rope from the far end coils. The motor is secured with a bracket. The adjustable motor driver switch allows controlling the motor with a 3-way switch. Pressing top of the button will move the motor clockwise causing the rope to pull the arms of the mounted gripper together thus grabbing the debris. The center of the button stops the motor, allowing the debris to be moved to desired location for dumping. The bottom of the button will move the motor counter clockwise unwinding the rope and opening the gripper to drop the debris. The mechanical advantages inherent in the present design do away with the pull cord tension needed for the gripping operation that necessitates using the supporting arm of the operator. The cord tension is maintained by the motor keeping the gripper closed while holding the debris as the operator swings the pole to a desired unloading position.

The present invention includes a video capture device such as a camera mounted on the far end of the pole. The camera is paired to a handheld video playback device like a smartphone or tablet utilizing any commercially available wireless technology. The intent of the camera is to provide real time clear view of the gutter to find precise location of the clog and the size of the clog to the operator maneuvering the device without having to constantly lookup.

The near end of the pole has a video playback device like a smartphone or a tablet mounting device where the paired smart phone can be mounted to see the camera view without lifting your head. The invention will be further understood upon consideration of the following detailed description of the drawings that are not to scale.

DETAILED DESCRIPTION OF THE INVENTION

The invention has presently taken the form of a gutter cleaning device as shown in FIG. 1-7. However, it may be readily adaptable to other applications where grasping of material from unreachable places is desired.

Figure 1:
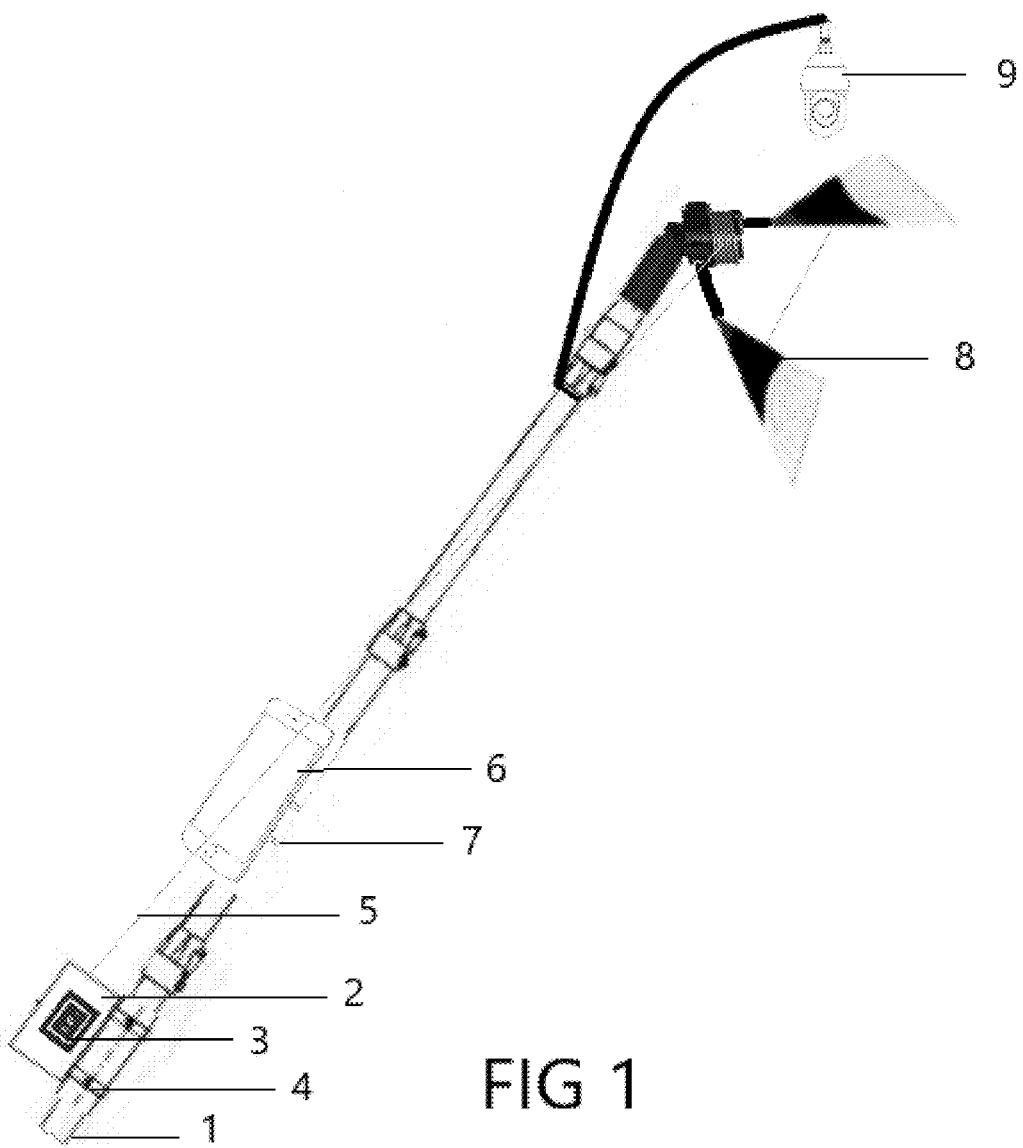
FIG. 1 is a perspective view of a gutter cleaning device with an embodiment of the invention.

As seen from FIG. 1, the tool utilizes an extensible pole of very light weight material 1. Any pole available in the household that is extensible and lightweight can be used. The tool is operated by button 3 attached to a housing 2 mounted on the elongated pole via brackets 4. The press member 3 controls the tension of the cord 5 bringing the gripper tongs 8 together to grip the debris. The center of the press member 3 will hold the tension in the cord while the operator moves the debris to the desired location. The bottom control of the press member 3 will release the tension of the cord opening the grippers and allowing the debris to be thrown at a desired location. The far end of the extensible pole is mounted with a camera 9 that is streaming video to the smart device 6 attached to the extensible pole via brackets 7.

Figure 2:
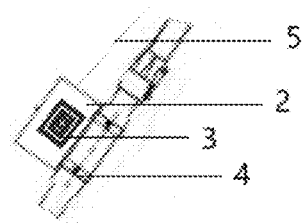
FIG. 2 is a perspective view of the near end of a gutter cleaning device made in accordance with this invention.
Figure 2A:
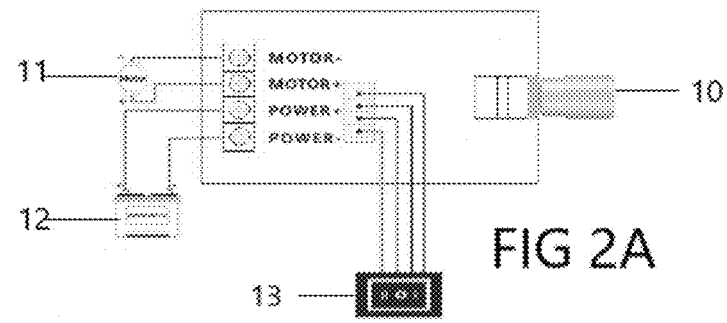
FIG. 2A is the cut away view of the motor mechanism in the housing. It shows the DC Motor speed controller and the motor driver switch setup.

FIG. 2A represents the inner working of the housing 2 shown in FIG. 1. The Housing contains a DC motor speed controller adjustable reversible motor driver switch setup. The speed controller 10 is used to control the speed of the motor 11. The device can be powered by a battery or connected to an AC outlet using an AC/DC adapter. The driver switch 13 is used to control the device from the housing as shown in FIG. 1 3.

Figure 3:
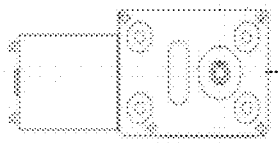
FIG. 3 is a perspective view of the DC Motor in use.
Figure 4:
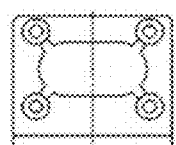
FIGS. 4, 4A and 4B are perspective views of the mounting bracket to mount the DC motor.
Figure 4A:
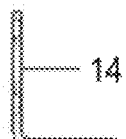
Figure 4B:
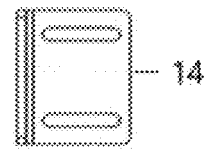
Figure 5:
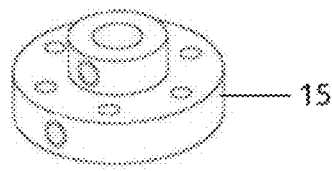
FIG. 5 is the perspective view of the mounting hub.
Figure 6:
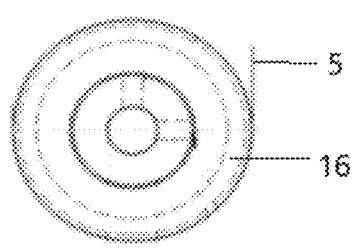
FIG. 6,6A is the perspective view of the wheel connected to the D Shaft on of the motor on which the wire will spool.
Figure 6A:
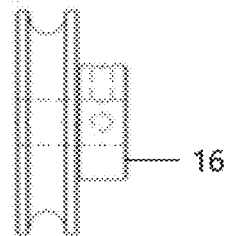
Figure 7:
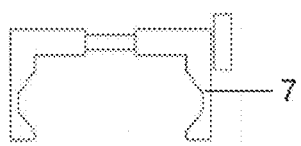
FIG. 7 is the bracket used to hold the video streaming device

FIG. 3 11 represents a DC motor and FIG. 4, 4A, 4B is the mounting bracket for the DC motor to the housing. FIG. 6,6A is the perspective view of the wheel that is mounted on the DC motor Shaft FIG. 2A 11 using mounting hub FIG. 5 15.

Using the video view from FIG. 1 6 the operator is able to place the device accurately at the location of the clog with full ergonomic access to the view of the debris. When the press member as shown in FIG. 2A 13 is pressed using the top button it causes the motor to move clockwise causing the rope to wind on the wheel FIG. 6 16 thereby increasing the tension of the rope leading to the arms of the mounted gripper at the far end to clasp together thus grabbing the debris. When the debris has been clasped by the gripper tongs FIG. 1 8, the center button of FIG. 2A 13 is used by the operator stops the motor, allowing the debris to be moved to desired location for dumping. The operator then presses the bottom button FIG. 2A 13 that will move the motor counter clockwise unwinding the rope, releasing the tension thereby opening the gripper to drop the debris.

The described embodiment is illustrative only and is not restrictive to the use described here in and the scope of the invention is therefore indicated by the claims rather than by the description above.

What is claimed is:

1. A tool for clearing material comprising an extensible pole having a near end and a far end; a pair of gripper tongs for collecting debris are mounted on the far end of the extensible pole and are attached to a line, cord, or rope flowing from outside of the pole into a housing mounted on the near end of the pole; said housing consists of a DC motor, a speed controller, and a motor drives switch; a shaft of the DC motor is attached via a mounting hub to a wheel over which the line, cord, or rope from the far end coils; the DC motor can be connected to a battery or to a power line using an AC/DC adapter; and the DC motor is operated by the motor driver switch connected to the DC motor, allowing operation of the far end gripper tongs using a directional speed control DC motor button.

* * * * *